July 27, 1965  A. G. SCHRAMM  3,196,965
PORTABLE WEIGHING SCALE STRUCTURE
Filed Feb. 26, 1964  3 Sheets-Sheet 1
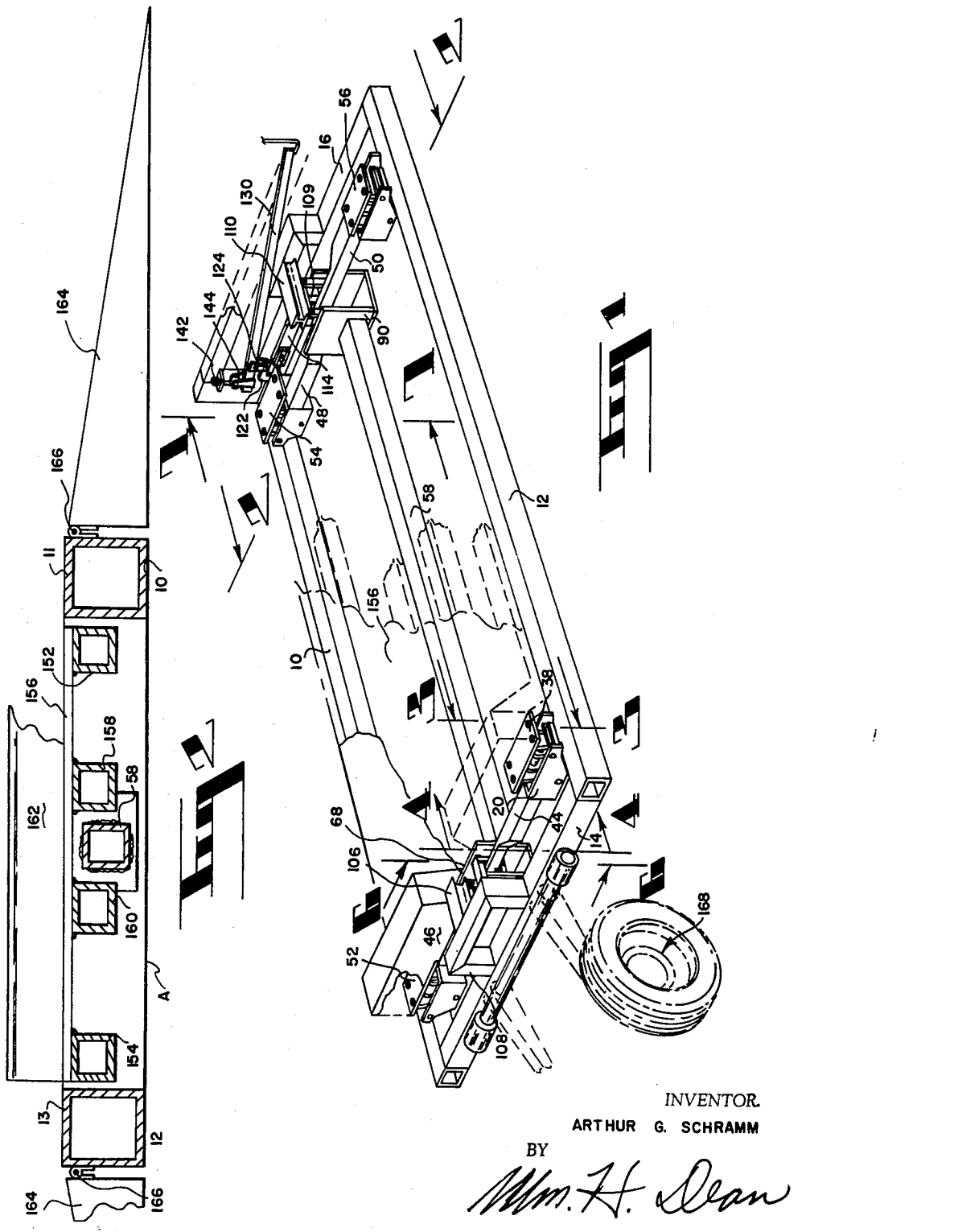
INVENTOR.
ARTHUR G. SCHRAMM
BY
Wm. H. Dean July 27, 1965   A. G. SCHRAMM   3,196,965
PORTABLE WEIGHING SCALE STRUCTURE
Filed Feb. 26, 1964   3 Sheets-Sheet 2
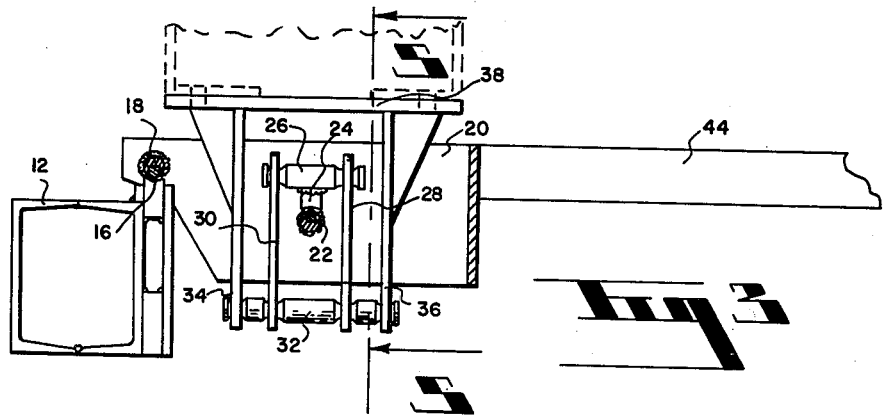
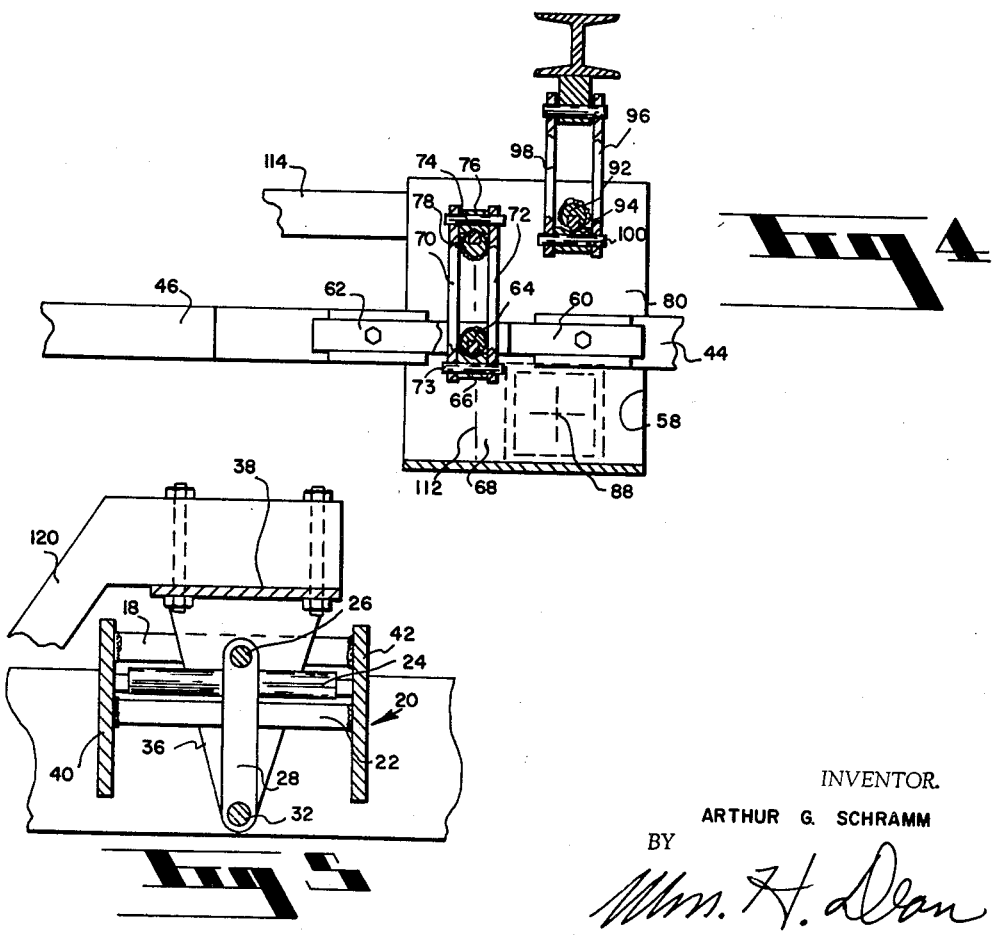
INVENTOR.
ARTHUR G. SCHRAMM
BY
Wm. H. Dean

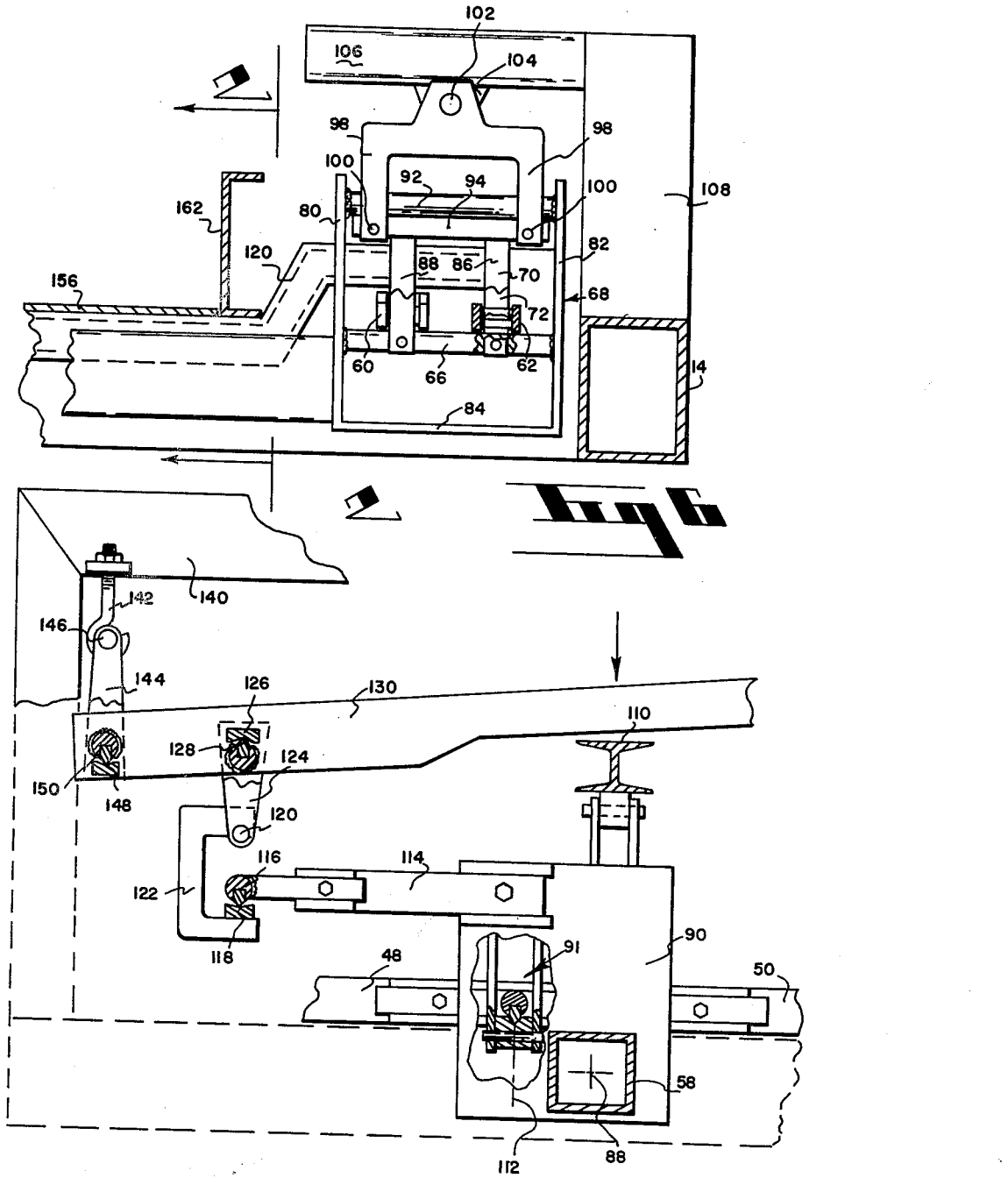

United States Patent Office 3,196,965
Patented July 27, 1965

3,196,965
PORTABLE WEIGHING SCALE STRUCTURE
Arthur G. Schramm, 215 N. 28th St., Phoenix, Ariz.
Filed Feb. 26, 1964, Ser. No. 347,408
10 Claims. (Cl. 177—133)

This invention relates to a portable weighing scale structure and more particularly to a portable weighing scale structure having a novel frame, weigh bridge and force translating structure which is very compact from a vertical standpoint so that trucks or other vehicles which are driven onto the scale when it is supported on the upper surface of the ground may climb a minimum elevation to reach a position on top of the scale weigh bridge platform.

According to some law and ordinances, trucks or other vehicles traveling on the highways, are limited to a maximum loading to prevent such trucks from creating undue unit pressure on roadways which causes portions of the roadway to break down, all of which is very expensive to the taxpayers in various municipalities.

In many instances, large trucks are sometimes overloaded to such an extent that the tire pressure on the roadway is excessive, thereby causing compression of asphalt surfaces or breakage of concrete roadbeds. When trucks pass through towns, they often cause such damage which is very expensive to repair. Accordingly, certain laws and ordinances have been in effect to prevent truckers from over-loading such trucks and causing such expensive damage.

Heretofore, it has been a problem to direct these trucks onto scales in order that the trucks may be weighed to check for overloading thereof.

As a result, it has been apparent that a mobile or portable scale may provide a law enforcement facility which can be utilized at the entrance to various towns along principal truck routes or highways. When a portable scale is movable from one place to another, it serves as a very useful law enforcement facility because the truck drivers are never certain whether or not their load may be checked and are, thus, very careful not to overload their truck. However, in order to maintain such law enforcement, it is necessary to have a portable weighing scale adapted to receive trucks or other vehicles and since these trucks are very heavy and since scales must be made quite sensitive to weight, the low elevation of such a scale supported on the ground has becomes an important factor. This is true, not only from the standpoint that large trucks have difficulty in climbing ramps to such scales under certain roadway conditions, but also it has been found that the scale itself is not subject to great shock loading if the elevation of the scale is low so as to enable the truck to climb upon the weigh bridge platform of the scale without an undue struggle. It has been found that the various axle loading of the trucks may conveniently be weighed as the trucks pass over the scale to indicate an overloading and therefore the low elevation of such a scale will permit the truck to pass smoothly over the scale and permit the operator to notice any overloading of either of the axles of the trucks as it slowly passes over the scale. Accordingly, the low level of the scale provides a slight elevation over which the truck must travel, but does not cause or create a necessity for the truck to rush or make a run at the scale to reach the upper elevation of the weigh bridge platform thereof. In this manner, the present invention solves many problems of weighing trucks as they slowly drive over the low elevation weigh bridge platform of the scale.

Accordingly, it is an object of the present invention to provide a portable weighing scale adapted to be supported on the upper surface of the ground and which has a very low level weigh bridge platform onto which trucks or other vehicles may readily drive without climbing to an undue elevation.

Another object of the invention is to provide a portable weighing scale adapted to be supported on the upper surface of the ground and which incorporates a compact low level frame, weigh bridge supporting means and force translating means, all of which is disposed at a low level and close to the ground.

Another object of the invention is to provide a novel portable scale structure adapted to be supported on the upper surface of the ground and which employs a novel frame and force translating means for the weigh bridge of the scale, including a torsion bar and force translating levers which provide great sensitivity of the scale in weighing small loads.

Another object of the invention is to provide a portable scale adapted to be supported on the upper surface of the ground and which is particularly adapted to check overloading of various vehicles, such as trucks or the like.

Another object of the invention is to provide a portable weighing scale having novel frame, weigh bridge and force translating structures which combine compact low elevation features close to the ground with great sensitivity and accuracy in the measurement of loads imposed on the weigh bridge of the scale.

Another object of the invention is to provide a portable weighing scale adapted to be supported on the upper surface of the ground and wherein knife edge bearings are used in a force translating mechanism for the weigh bridge of the scale; and means to maintain accurate engagement of the knife edge bearings to compensate for a tendency in the misalignment of such bearings when slight deflection of the frame occurs.

Further objects and advantages of the invention may be apparent from the following specification, appended claims and accompanying drawings, in which:

FIG. 1 is a perspective view of a portable weighing scale structure in accordance with the present invention and illustrating portions thereof broken away to amplify the illustration and further illustrating by broken lines, a related transporting means upon which such structure may be elevated for transportation, said last mentioned means being no part of the present invention;

FIG. 2 is an enlarged fragmentary sectional view taken from the line 2—2 of FIGS. 1 and 6;

FIG. 3 is an enlarged fragmentary sectional view taken from the line 3—3 of FIG. 1;

FIG. 4 is an enlarged fragmentary sectional view taken from the line 4—4 of FIG. 1;

FIG. 5 is a fragmentary sectional view taken from the line 5—5 of FIG. 3;

FIG. 6 is an enlarged fragmentary sectional view taken from the line 6—6 of FIG. 1; and FIG. 7 is an enlarged fragmentary sectional view taken from the line 7—7 of FIG. 1, showing portions of the structure broken away and in section to amplify the illustration.

The portable scale structure, as shown in FIG. 1 of the drawings is provided with an outline structural steel frame having opposite side members 10 and 12 rigidly connected to opposite end members 14 and 16. These members are generally box shaped in cross-section, as shown, but may be any other suitable structural shape, as desired, which according to the skill of a designer may be compact vertically in order to carry and support the structure of the scale of the invention.

As shown in FIG. 3 of the drawings, the side frame member 12 supports a bearing cradle 16 engaged by a downwardly directed knife edge bearing structure 18 secured between opposite sides of a bearing box 20. Also supported between opposite sides of the bearing box 20 is an upwardly directed knife edge bearing 22 engaged by a downwardly directed cradle portion 24 which is a complemental knife edge bearing structure. This cradle 24 is fixed to a shaft 26 by welding or otherwise and opposite ends of the shaft 26 are pivotally connected to tension links 28 and 30, the lower ends of which are pivotally mounted on a bearing shaft 32. Attention being called to the disclosure of FIG. 5 with respect to the shafts 26 and 32 and the tension links 28 and 30.

Also pivotally connected to the shaft 32 are load bearing struts 34 and 36 at the upper ends of which a weigh bridge supporting plate 38 is fixed by welding or otherwise.

It will be seen that the struts 34 and 36 and the links 28 and 30 are disposed between opposite sides 40 and 42 of the bearing box 20.

Connected to the bearing box 20 is a force translating lever 44 which is similar to other force translating levers 46, 48 and 50, which are mechanically related to weigh bridge supporting plates 52, 54 and 56 in the same manner that the lever 44 is related to the weigh bridge supporting plate 38, as hereinbefore described, in connection with FIGS. 3 and 5 of the drawings. Thus, a pair of these force translating levers is disposed near each opposite end of the frame which comprises the opposite sides 10 and 12 and the opposite ends 14 and 16.

The force translating levers 44, 46, 48 and 50 at their opposite ends from the ends thereof which are connected to the respective bearing boxes, such as the bearing box 20, are provided with knife edge bearings which transmit forces to a torsion bar structure 58.

As shown in FIG. 4 of the drawings, the levers 44 and 46 are provided with bifurcated plate structures 60 and 62, respectively, which carry knife edge bearings 64 in the same plane. The knife edge bearings 64 as shown in FIG. 4 being connected to the bifurcated ends 62 of the lever 46. However, similar structure is connected to the lever 44, as shown in FIG. 6 of the drawings. The knife edge structures 64 bear on an upwardly directed knife edge bearing cradle 66 located between opposite sides of a substantially U-shaped in cross-section bearing box 68 which is fixed to one end of the torsion bar 58. The cross-sectional shape of this bearing box 68 is shown in FIGS. 1 and 6 of the drawings. The cradle 66 is supported between the upstanding sides of the bearing box 68 by means of links 70 and 72 through which a shear pin 73 extends transversely and thereby carrying the bearing cradle 66 free to pivot about the axis of the pin 73 for alignment. The links 70 and 72 are pivotally connected to a pin 74 at their upper ends which passes through a downwardly directed knife edge bearing cradle 76 which is carried on an upwardly directed knife edge bearing 78 having its opposite ends fixedly supported between the upstanding sides 80 and 82 of the U-shaped bearing box 68 which is provided with a lower portion 84 integral with and connecting the upstanding sides 80 and 82. Thus, the upwardly directed knife edge bearing structure 78 may be welded or otherwise fixed to opposite sides 80 and 82 of the bearing box 68.

It will be seen that the links 70 and 72 are substantially aligned with the bifurcated portions 62 of the lever 46.

As shown in FIG. 6, links 86 and 88 are similar to the links 70 and 72 and are pivotally connected to the bearing cradle 66 and the upwardly directed knife edge bearing 78, as are the links 70 and 72. Thus, the links 70 and 72 and 80 and 82 are permitted to pivot on axes laterally of both of the knife edge bearings 64 and 78, and also the bearing cradles 66 and 76 to thereby maintain intimate engagement and proper alignment of these knife edge bearing structures. It will also be appreciated that force from both the levers 44 and 46 are freely and pivotally translated or transferred to the upwardly bearing knife edge structure 78 which is located laterally of a neutral axis location 88 of the torsion bar 58 shown in FIG. 4 of the drawings.

The levers 48 and 50, as shown in FIGS. 1 and 7 of the drawings, are pivotally coupled to a bearing box 90 which is similar to the bearing box 68, hereinbefore described. This bearing box 90 is fixed to an opposite end of the torsion bar 58 from the end thereof which is fixed to the bearing box 68. The levers 48 and 50 are pivotally connected to the bearing box 90 by knife edge bearing structure and linkage similar to that shown in FIG. 4 and disposed in alignment therewith and offset laterally of the axis 88 of the torsion bar 58 in the same direction so that all of the levers 44, 46, 48 and 50 exert force downwardly laterally of the axis 88 of the torsion bar 58 tending to rotate the bar, as will be hereinafter described in detail.

The bearing box 68, shown in FIGS. 4 and 6 of the drawings, is provided with a downwardly directed knife edge bearing structure 92 having opposite ends fixedly connected to the opposite sides 80 and 82 of this bearing box 68. Engaging this downwardly directed knife edge bearing 92 is an upwardly directed knife edge bearing cradle 94 pivotally connected with suspension links 96 and 98 by means of pins 100 of which there are two shown in FIG. 6 of the drawings. These links 96 and 98 are pivotally connected by a common pivot pin 102 with a bearing boss 104 of a cantilever member 106 secured to an upstanding portion 108 fixed to the end member 14 of the main frame. Due to the cantilever mounting of the knife edge bearing 92 by the cantilever portion 106 of the frame and due to possible deflection of the frame, the pin 102 is provided to permit precise alignment of the cradle 94 with the knife edge bearing structure 92.

The bearing box 90 is supported by a knife edge bearing structure and linkage 109 similar to the hereinbefore described structure, as illustrated in FIG. 4 of the drawings, involving the knife edge bearing 92 and its related linkage and suspension mechanism. This structure 109 is supported by a cantilever portion of the frame 110 similar to the cantilever portion 106, hereinbefore described.

It will be seen from the disclosures of FIGS. 4 and 7, that the load transmitting axis 112 of the levers 44, 46, 48 and 50 is laterally of the axis 88 of the torsion bar 58 and the pivotal suspension axis of the bearing boxes 68 and 90 on the main frame is provided by the knife edge bearing structures 92, shown in FIG. 4 of the drawings, which are located substantially above the pivotal axis of the torsion bar 58. Thus, down bearing loads applied by the force translating levers at the axis 112 tend to cause rotation of the torsion bar 58. Actually the levers 44 and 46 transmit load through the torsion bar 58 to the bearing box 90 and a lever 114 fixed to the bearing box 90 transmits the total loading of the weigh bridge, the levers and that applied by the torsion bar 58 from one end of the weigh bridge to calibrated scale mechanism.

The lever 114 is provided with a downwardly directed knife edge bearing structure 116 bearing on a knife edge bearing cradle 118 which is pivotally suspended by a pin 120 carrying a yoke 122 on which the knife edge bearing cradle 118 is supported. The member 122 is carried by a clevis 124 connected to a downwardly directed knife edge bearing cradle 126 engaging an upwardly directed knife edge bearing 128 fixed to a lever 130. This lever 130 being supported on an upstanding portion 140 of the main frame by an eye bolt 142. A clevis 144 pivotally connected to the eye bolt by a pin 146. The clevis 144 is provided with an upwardly directed knife edge bearing cradle 148 which engages a downwardly directed knife edge bearing 150 fixed to the lever 130. Thus, the knife edge bearing cradle 148 provides a pivotal support for the lever while the down bearing load of the lever 114 and the related linkage causes a tendency to move the lever 130 downwardly and it is connected to a calibrated scale mechanism, not shown, and which is no part of the present invention.

From the foregoing it will be appreciated that the torsion bar 58, as shown in FIGS. 1 and 2 of the drawings, is supported at a low level slightly above the ground level A, as shown in FIG. 2 of the drawings, and that it is located between the frame side members 10 and 12 below the upper surfaces 11 and 13, respectively, thereof.

The weigh bridge supporting plates 38, 52 and 56 support the weigh bridge by means of opposite ends of horizontal structural supports 116 and 118 which are adjacent to the frame side members 10 and 12, respectively. As shown in FIG. 6 of the drawings, opposite ends of the structural members 116 and 118 are provided with upwardly extending gooseneck portions 120 which are supported on top of the weigh bridge supporting plates 38, 52, 54 and 56. These gooseneck portions 120, thus, are integral with opposite ends of the structural members 116 and 118 and support the weigh bridge platform or deck plate 156, shown best in FIGURE 2 of the drawings.

This plate 156 is supported by longitudinal structural members 158 and 160 adjacent to and parallel with the torsion bar 58. These structural members 158 and 160 at their opposite ends are fixed to and supported by an overlying channel member 162 which extends laterally of structural members 158 and 160 and is secured to the structural members 152 and 154 to transfer loading on the structural members 158 and 160 to the gooseneck portions 120 and consequently to the weigh bridge supporting plates 38, 52, 54 and 56.

It will be seen that the weigh bridge deck plate or platform 156 is located and supported slightly above the torsion bar 58 and that it is supported slightly above the ground A. The frame members 10, 12, 14 and 16 rest upon the ground A, and coupled to each frame member 10 and 12 is an inclined ramp structure 164 secured by a hinge 166. Due to the low elevation of each element of the frame 10 and due to the low level of the weigh bridge deck or platform 156 a truck may drive up the low angle ramp 164 and over the respective frame side member and onto the deck 156 and in this manner, during transportation, the ramps 164 may be pivoted upwardly into vertical position and the entire scale structure, shown in FIGURE 1, may be elevated and transported on wheel mounted vehicle means, generally designated 168 in FIGURE 1 of the drawings. This vehicle means is no part of the present invention.

It will be appreciated, however, that the portability of the scale structure, as hereinbefore described, and its low elevation is dependent upon the structure shown in FIGURE 2 wherein the frame, the torsion bar 58, the structural members 152, 154, 158 and 160 are between the frame members and the weigh bridge deck or platform 156 is very slightly above the torsion bar 58 which in turn is only slightly elevated above the ground on which the scale structure rests.

It will be apparent to those skilled in the art that this portable scale structure provides a very useful facility for checking overloaded trucks at various locations along the highways or straights, and that it may be transported at any time to a surprise location in order to induce law enforcement relative to the overloading of trucks or other vehicles. The low elevational level of the platform 156 and the low angle of the inclined ramps 164 permits a truck slowly to drive over the weigh bridge platform 156 and to thereby progressively check the weight of each axle of the truck without stopping it. When and if the truck is overloaded, the sensitive mechanism of the scale, as hereinbefore described, indicates to the operator immediately that the truck is overloaded and whereupon the operator may stop the truck and accurately check the total weight thereof to determine the overload so that a record may be made upon which the trucker may be penalized in accordance with the law which may pertain thereto.

In operation, a load imposed on the weigh bridge or platform deck 156 is carried by the structural members 152, 154, 158 and 160, and transmitted, as hereinbefore described, to the gooseneck portions 120 of the structural members 152 and 154 which bear down upon the weigh bridge supporting plates 38, 52, 54 and 56. These plates by means of the struts 34 and 36 transmit force to the respective shaft 32 which applies tension to respective links 28 and 30 pivotally mounted on the respective shaft 26 which exerts a downbearing load on the knife edge bearing cradle 24 which forces the upwardly directed knife edge 22 downwardly, therefore, exerting downward force on the respective one of each of the levers 44, 46, 48 and 50. These levers, as hereinbefore described, transmit force by means of the knife edge structures to the torsion bar 58 which carries the load from the end of the scale bearing on the plates 38 and 52. This load is coupled with the load from the other end of the plate by the bearing box 90 to which the lever 114 is connected. This lever 114 as hereinbefore described exerts force which is finally transmitted through lever and linkage means to the lever 130 which is connected to a conventional beam or calibrated scale structure which can be read in units of weight by the operator of the scale.

It will be obvious to those skilled in the art that various modifications of the invention may be resorted to in a manner limited only by a just interpretation of the following claims.

I claim:

1. In a portable weighing scale structure the combination of: a frame having opposite ends and sides; first and second bearing means each supported by one respective side of said frame near each one of its said ends; first and second levers pivotally supported on respective first and second bearing means; a free end of each lever extending toward an area intermediately disposed between said sides; first and second weigh bridge mounts pivotally supported on said first and second levers at locations spaced from said first and second bearing means; a torsion bar disposed in said intermediate area between opposite sides of said frame; torsion bar suspension means; opposite ends of said torsion bar pivotally suspended from respective ends of said frame by said torsion bar suspension means to permit said torsion bar to rotate about its longitudinal axis; lever bearing means coupled to said torsion bar and disposed laterally of the pivotal axis of said torsion bar suspension means; said free ends of said first and second levers engaged with said lever bearing means; and a force transmitting lever coupled to one end of said torsion bar and adapted to transmit force to a weight measuring instrument, said frame adapted to rest on the ground; a weigh bridge suspended from said weigh bridge mounts and having an upper surface disposed on a level below said levers, said levers being located on said frame at positions outwardly beyond said weigh bridge to thereby permit said frame to support said weigh bridge at a low elevation relative to the ground.

2. In a portable weighing scale structure the combination of: a frame having opposite ends and sides; first and second bearing means each supported by one respective side of said frame near each one of its said ends; first and second levers pivotally supported on respective first and second bearing means; a free end of each lever extending toward an area intermediately disposed between said sides; first and second weigh bridge mounts pivotally supported on said first and second levers at locations spaced from said first and second bearing means; a torsion bar disposed in said intermediate area between opposite sides of said frame; torsion bar suspension means; opposite ends of said torsion bar pivotally suspended from respective ends of said frame by said torsion bar suspension means to permit said torsion bar to rotate about its longitudinal axis; lever bearing means coupled to said torsion bar and disposed laterally of the pivotal axis of said torsion bar suspension means; said free ends of said first and second levers engaged with said lever bearing means; and a force transmitting lever coupled to one end of said torsion bar and adapted to transmit force to a weight measuring instrument, said frame adapted to rest on the ground; a weigh bridge suspended from said weigh bridge mounts and having an upper surface disposed on a level below said levers, said levers being located on said frame at positions outwardly beyond said weigh bridge to thereby permit said frame to support said weigh bridge at a low elevation relative to the ground, said torsion bar and said sides of said frame disposed in a substantially common horizontal plane area; said weigh bridge disposed in slight spaced relation to and above said torsion bar.

3. In a portable weighing scale structure the combination of: a frame having opposite ends and sides; first and second bearing means each supported by one respective side of said frame near each one of its said ends; first and second levers pivotally supported on respective first and second bearing means; a free end of each lever extending toward an area intermediately disposed between said sides; first and second weigh bridge mounts pivotally supported on said first and second levers at locations spaced from said first and second bearing means; a torsion bar disposed in said intermediate area between opposite sides of said frame; torsion bar suspension means; opposite ends of said torsion bar pivotally suspended from respective ends of said frame by said torsion bar suspension means to permit said torsion bar to rotate about its longitudinal axis; lever bearing means coupled to said torsion bar and disposed laterally of the pivotal axis of said torsion bar suspension means; said free ends of said first and second levers engaged with said lever bearing means; and a force transmitting lever coupled to one end of said torsion bar and adapted to transmit force to a weight measuring instrument, said frame adapted to rest on the ground; a weigh bridge suspended from said weigh bridge mounts and having an upper surface disposed on a level below said levers, said levers being located on said frame at positions outwardly beyond said weigh bridge to thereby permit said frame to support said weigh bridge at a low elevation relative to the ground, said torsion bar and said sides of said frame disposed in a substantially common horizontal plane area; said weigh bridge disposed in slight spaced relation to and above said torsion bar; ground engaging portions of said frame disposed to support said frame in close proximity to the ground and to support said torsion bar slightly above the ground and to thereby maintain a minimum elevation of said weigh bridge of said portable scale structure above ground level.

4. In a portable weighing scale structure the combination of: a frame having opposite ends and sides; first and second bearing means each supported by one respective side of said frame near each one of its said ends; first and second levers pivotally supported on respective first and second bearing means; a free end of each lever extending toward an area intermediately disposed between said sides; first and second weigh bridge mounts pivotally supported on said first and second levers at locations spaced from said first and second bearing means; a torsion bar disposed in said intermediate area between opposite sides of said frame; torsion bar suspension means; opposite ends of said torsion bar pivotally suspended from respective ends of said frame by said torsion bar suspension means to permit said torsion bar to rotate about its longitudinal axis; lever bearing means coupled to said torsion bar and disposed laterally of the pivotal axis of said torsion bar suspension means; said free ends of said first and second levers engaged with said lever bearing means; and a force transmitting lever coupled to one end of said torsion bar and adapted to transmit force to a weight measuring instrument, said frame adapted to rest on the ground; a weigh bridge suspended from said weigh bridge mounts and having an upper surface disposed on a level below said levers, said levers being located on said frame at positions outwardly beyond said weigh bridge to thereby permit said frame to support said weigh bridge at a low elevation relative to the ground, said torsion bar and said sides of said frame disposed in a substantially common horizontal plane area; said weigh bridge disposed in slight spaced relation to and above said torsion bar; ground engaging portions of said frame disposed to support said frame in close proximity to the ground and to support said torsion bar slightly above the ground and to thereby maintain a minimum elevation of said weigh bridge of said portable scale structure above ground level; and incline ramp means pivotally connected to said frame and engageable with the ground when said frame is supported on the ground by said ground engaging means, said ramp means having an upper end of its upper surface portion disposed on substantially a common plane with an uppermost surface of said weigh bridge and said frame.

5. In a portable weighing scale structure the combination of: a frame having opposite ends and sides; first and second bearing means each supported by one respective side of said frame near each one of its said ends; first and second levers pivotally supported on respective first and second bearing means; a free end of each lever extending toward an area intermediately disposed between said sides; first and second weigh bridge mounts pivotally supported on said first and second levers at locations spaced from said first and second bearing means; a torsion bar disposed in said intermediate area between opposite sides of said frame; torsion bar suspension means; opposite ends of said torsion bar pivotally suspended from respective ends of said frame by said torsion bar suspension means to permit said torsion bar to rotate about its longitudinal axis; lever bearing means coupled to said torsion bar and disposed laterally of the pivotal axis of said torsion bar suspension means; said free ends of said first and second levers engaged with said lever bearing means; and a force transmitting lever coupled to one end of said torsion bar and adapted to transmit force to a weight measuring instrument; said torsion bar suspension means comprising a bearing box connected to each opposite end of said torsion bar; knife edge bearing means supported between opposite sides of said bearing box and substantially parallel with the axis of said torsion bar; means supported by said end members of said frame and connected to said knife edge bearing means for suspending each of said bearing boxes connected to each end of said torsion bar; and further knife edge bearing means being part of said lever bearing means and coupled to said bearing boxes to receive down bearing load of said levers at their free ends.

6. In a portable weighing scale structure the combination of: a frame having opposite ends and sides; first and second bearing means each supported by one respective side of said frame near each one of its said ends; first and second levers pivotally supported on respective first and second bearing means; a free end of each lever extending toward an area intermediately disposed between said sides; first and second weigh bridge mounts pivotally supported on said first and second levers at locations spaced from said first and second bearing means; a torsion bar disposed in said intermediate area between opposite sides of said frame; torsion bar suspension means; opposite ends of said torsion bar pivotally suspended from respective ends of said frame by said torsion bar suspension means to permit said torsion bar to rotate about its longitudinal axis; lever bearing means coupled to said torsion bar and disposed laterally of the pivotal axis of said torsion bar suspension means; said free ends of said first and second levers engaged with said lever bearing means; and a force transmitting lever coupled to one end of said torsion bar and adapted to transmit force to a weight measuring instrument, said frame adapted to rest on the ground; a weigh bridge suspended from said weigh bridge mounts and having an upper surface disposed on a level below said levers, said levers being located on said frame at positions outwardly beyond said weigh bridge to thereby permit said frame to support said weigh bridge at a low elevation relative to the ground, said first and second bearing means being knife edge bearings; bearing boxes coupled to said levers and carrying knife edge bearing means forming said weigh bridge mount supports for pivotally supporting said weigh bridge mounts on said levers; said last mentioned bearing boxes on said levers having knife edge bearing means operable on tiltable axes disposed laterally of said levers and also pivotal linkage supporting said weigh bridge mounts carried by said last mentioned knife edge bearing means and operable pivotally at substantially right angles thereto.

7. In a portable weighing scale structure the combination of: a frame having opposite ends and sides; first and second bearing means each supported by one respecive side of said frame near each one of its said ends; first and second levers pivotally supported on respective first and second bearing means; a free end of each lever extending toward an area intermediately disposed between said sides; first and second weigh bridge mounts pivotally supported on said first and second levers at locations spaced from said first and second bearing means; a torsion bar disposed in said intermediate area between opposite sides of said frame; torsion bar suspension means; opposite ends of said torsion bar pivotally suspended from respective ends of said frame by said torsion bar suspension means to permit said torsion bar to rotate about its longitudinal axis; lever bearing means coupled to said torsion bar and disposed laterally of the pivotal axis of said torsion bar suspension means; said free ends of said first and second levers engaged with said lever bearing means; and a force transmitting lever coupled to one end of said torsion bar and adapted to transmit force to a weight measuring instrument, said frame adapted to rest on the ground; a weigh bridge suspended from said weigh bridge mounts and having an upper surface disposed on a level below said levers, said levers being located on said frame at positions outwardly beyond said weigh bridge to thereby permit said frame to support said weigh bridge at a low elevation relative to the ground; said first and second bearing means being knife edge bearings; force transmitting bearing coupled to said levers and carrying knife edge bearing means forming said weigh bridge mount supports for pivotally supporting said weigh bridge mounts on said levers; said last mentioned force transmitting bearing on said levers having knife edge bearing means operable on tiltable axes disposed laterally of said levers and also pivotal linkage supporting said weigh bridge mounts carried by said last mentioned knife edge bearing means and operable pivotally at substantially right angles thereto; said force transmitting bearing carrying said lever bearing means; said lever bearing means being knife edge bearings pivotally operable at substantially right angles to the longitudinal axes of said levers and supporting the inwardly extending free ends of said levers in said last mentioned force transmitting bearing: cantilever portions extending inwardly from opposite ends of said frame and above said last mentioned force transmitting bearing; pivotal suspension means comprising knife edge structures supported pivotally by said cantilever portions and pivotally supporting said last mentioned force transmitting bearing in pivotal axes substantially parallel with said levers at right angles to said levers whereby knife edge bearing means supporting said force transmitting bearing may maintain precise alignment to insure proper pivotal bearing thereof.

8. In a portable weighing scale structure the combination of: a frame having opposite ends and sides; first and second bearing means each supported by one respective side of said frame near each one of its said ends; first and second levers pivotally supported on respective first and second bearing means; a free end of each lever extending toward an area intermediately disposed between said sides; first and second weigh bridge mounts pivotally supported on said first and second levers at locations spaced from said first and second bearing means; a torsion bar disposed in said intermediate area between opposite sides of said frame; torsion bar suspension means; opposite ends of said torsion bar pivotally suspended from respective ends of said frame by said torsion bar suspension means to permit said torsion bar to rotate about its longitudinal axis; lever bearing means coupled to said torsion bar and disposed laterally of the pivotal axis of said torsion bar suspension means; said free ends of said first and second levers engaged with said lever bearing means; and a force transmitting lever coupled to one end of said torsion bar and adapted to transmit force to a weight measuring instrument, said frame adapted to rest on the ground; a weigh bridge suspended from said weigh bridge mounts and having an upper surface disposed on a level below said levers, said levers being located on said frame at positions outwardly beyond said weigh bridge to thereby permit said frame to support said weigh bridge at a low elevation relative to the ground said torsion bar and said sides of said frame disposed in a substantially common horizontal plane area; said weigh bridge disposed in slight spaced relation to and above said torsion bar; said weigh bridge comprising a plurality of reinforcing members disposed substantially parallel to the sides of said frame and parallel to said torsion bar; a pair of said members adjacent said sides of said frame having offset portions extending upwardly and fixed to said weigh bridge mounts; other members of said weigh bridge extending longitudinally and parallel with said torsion bar and in proximity thereto; rails disposed transversely of said other members and also coupled to said members having said gooseneck portions to transfer load from the members at opposite sides of said torsion bar to the members having said gooseneck portions and supported on said weigh bridge mounts; and a platform plate covering said members adjacent said frame sides and adjacent said torsion bar; said plate slightly clearing the upper portion of said torsion bar.

9. In a portable weighing scale structure the combination of: a frame having opposite ends and sides; first and second bearing means each supported by one respective side of said frame near each one of its said ends; first and second levers pivotally supported on respective first and second bearing means; a free end of each lever extending toward an area intermediately disposed between said sides; first and second weigh bridge mounts pivotally supported on said first and second levers at locations spaced from said first and second bearing means; a torsion bar disposed in said intermediate area between opposite sides of said frame; torsion bar suspension means; opposite ends of said torsion bar pivotally suspended from respective ends of said frame by said torsion bar suspension means to permit said torsion bar to rotate about its longitudinal axis; lever bearing means coupled to said torsion bar and disposed laterally of the pivotal axis of said torsion bar suspension means; said free ends of said first and second levers engaged with said lever bearing means; and a force transmitting lever coupled to one end of said torsion bar and adapted to transmit force to a weight measuring instrument, said frame adapted to rest on the ground; a weigh bridge suspended from said weigh bridge mounts and having an upper surface disposed on a level below said levers, said levers being located on said frame at positions outwardly beyond said weigh bridge to thereby permit said frame to support said weigh bridge at a low elevation relative to the ground said torsion bar and sides of said frame disposed in a substantially common horizontal plane area; said weigh bridge disposed in slight spaced relation to and above said torsion bar; said weigh bridge comprising a plurality of reinforcing members disposed substantially parallel to the sides of said frame and parallel to said torsion bar; a pair of said members adjacent said sides of said frame having offset portions extending upwardly and fixed to said weigh bridge mounts; other members of said weigh bridge extending longitudinally and parallel with said torsion bar and in proximity thereto;

said rails disposed transversely of said other members and also coupled to said members having said gooseneck portions to transfer load from the members at opposite sides of said torsion bar to the members having said gooseneck portions and supported on said weigh bridge mounts; and a platform plate covering said members adjacent said frame sides and adjacent said torsion bar; said plate slightly clearing the upper portion of said torsion bar; the upper portion of said platform being near the elevation of the upper portion of said frame side members.

10. In a portable weighing scale structure the combination of: a frame having opposite ends and sides; first and second bearing means each supported by one respective side of said frame near each one of its said ends; first and second levers pivotally supported on respective first and second bearing means; a free end of each lever extending toward an area intermediately disposed between said sides; first and second weigh bridge mounts pivotally supported on said first and second levers at locations spaced from said first and second bearing means; a torsion bar disposed in said intermediate area between opposite sides of said frame; torsion bar suspension means; opposite ends of said torsion bar pivotally suspended from respective ends of said frame by said torsion bar suspension means to permit said torsion bar to rotate about its longitudinal axis; lever bearing means coupled to said torsion bar and disposed laterally of the pivotal axis of said torsion bar suspension means; said free ends of said first and second levers engaged with said lever bearing means; and a force transmitting lever coupled to one end of said torsion bar and adapted to transmit force to a weight measuring instrument, said frame adapted to rest on the ground; a weigh bridge suspended from said weigh bridge mounts and having an upper surface disposed on a level below said levers, said levers being located on said frame at positions outwardly beyond said weigh bridge to thereby permit said frame to support said weigh bridge at a low elevation relative to the ground said torsion bar and said sides of said frame disposed in a substantially common horizontal plane area; said weigh bridge disposed in slight spaced relation to and above said torsion bar; said weigh bridge comprising a plurality of reinforcing members disposed substantially parallel to the sides of said frame and parallel to said torsion bar; a pair of said members adjacent said sides of said frame having offset portions extending upwardly and fixed to said weigh bridge mounts; other members of said weigh bridge extending longttudinally and parallel with said torsion bar and in proximity thereto; rails disposed transversely of said other members and also coupled to said members having said gooseneck portions to transfer load from the members at opposite sides of said torsion bar to the members having said gooseneck portions and supported on said weigh bridge mounts; and a platform plate covering said members adjacent said frame sides and adjacent said torsion bar; said plate slightly clearing the upper portion of said torsion bar; the upper portion of said platform being near the elevation of the upper portion of said frame side members; pivoted ramp members pivotally connected to said side members and extending from an uppermost portion thereof downwardly on a decline to the surface of the ground when said ramp members are pivoted outwardly and downwardly and resting upon the ground.

References Cited by the Examiner
UNITED STATES PATENTS

| | | | |
|---|---|---|---|
| 829,299 | 8/06 | Skidmore | 177—246 |
| 1,759,880 | 5/30 | Barrett et al. | 177—134 |
| 2,823,911 | 2/58 | Murphy | 177—246 X |

LEO SMILOW, *Primary Examiner.*